United States Patent
Cheng et al.

(10) Patent No.: US 10,380,501 B2
(45) Date of Patent: Aug. 13, 2019

(54) LOOKALIKE EVALUATION

(71) Applicant: Facebook, Inc., Menlo Park, CA (US)

(72) Inventors: Haibin Cheng, San Jose, CA (US); Xian Xu, Menlo Park, CA (US); Yang Pei, Menlo Park, CA (US)

(73) Assignee: Facebook, Inc., Menlo Park, CA (US)

( * ) Notice: Subject to any disclaimer, the term of this patent is extended or adjusted under 35 U.S.C. 154(b) by 934 days.

(21) Appl. No.: 14/941,495

(22) Filed: Nov. 13, 2015

(65) Prior Publication Data

US 2017/0140283 A1    May 18, 2017

(51) Int. Cl.
*G06F 15/18*    (2006.01)
*G06N 20/00*    (2019.01)

(52) U.S. Cl.
CPC ..................... *G06N 20/00* (2019.01)

(58) Field of Classification Search
CPC ............................ G06N 5/04; G06F 17/30598
USPC ...................................................... 706/15, 45
See application file for complete search history.

(56) References Cited

U.S. PATENT DOCUMENTS

| | | | |
|---|---|---|---|
| 2012/0233191 A1* | 9/2012 | Ramanujam | G06F 17/30867 707/758 |
| 2013/0290339 A1* | 10/2013 | LuVogt | G06F 17/30867 707/740 |
| 2014/0012593 A1* | 1/2014 | Kim | G06F 19/00 705/2 |
| 2014/0308634 A1* | 10/2014 | Mishra | G09B 19/00 434/236 |
| 2016/0267545 A1* | 9/2016 | Glass | H04L 67/306 |
| 2016/0307101 A1* | 10/2016 | Zhang | G06Q 50/01 |

* cited by examiner

*Primary Examiner* — David R Vincent
(74) *Attorney, Agent, or Firm* — Fenwick & West LLP

(57) ABSTRACT

Lookalike models can select users that are predicted to share characteristics with a specified set of seed users. The processing requirements for lookalike models can be decreased by identifying features that have low impact on model accuracy, and therefore can be excluded from creating models. Also, by identifying preferred seed sources and training parameters, accurate lookalike models can be created with less overhead and in less time. The features and training parameters can be identified by obtaining a sample seed set, extracting seeds with a defined set of features, and using the remaining training seeds to train a model. Performance of this model can be compared to a standard model to see if the model performs well. If so, features excluded from the features used to create the model, a seed source, or training parameters used to create the model can be selected.

20 Claims, 7 Drawing Sheets

LOOKALIKE EVALUATION

BACKGROUND

Many digital content producers such as online stores, social media providers, search engine providers, etc., try to predict user actions and characteristics. Digital content can include any type of content that can be presented by a computing system, such as images, advertisements, video, applications, text, projections, etc. As examples, of prediction, an online store can try to predict which products those users will purchase; a social media provider can try to predict which advertisements users that visit their website will click on; or a search engine provider can try to predict the interests of a user who is performing a search.

One way digital content producers can attempt this analysis is by utilizing machine learning engines. A "machine learning engine," as used herein, refers to a construct that is trained using training data to make predictions for new data items, whether or not the new data items were included in the training data. For example, training data can include items with various parameters and an assigned classification. A new data item can have parameters that a machine learning engine can use to assign a classification to the new data item. Examples of machine learning engines include: neural networks, support vector machines, decision trees, Parzen windows, Bayes, clustering, reinforcement learning, and others. Machine learning engines can be configured for various situations, data types, sources, and output formats. These factors provide a nearly infinite variety of machine learning engine configurations.

The amount of data available for training machine learning engines is growing at an exponential rate. It is common for web providers, for example, to operate databases with petabytes of data, while leading content providers are already looking toward technology to handle exabyte implementations. One popular social media website, for example, has over a billion active users that spend a total of over ten million hours each month interacting with the website. These users can produce hundreds of millions of interactions with other users and content items (e.g. messages, friend requests, content likes, link selections, etc.) and content posts each day. In addition, each user can be associated with a user profile and other inferred characteristics about users such as writing style, interests, skills, etc.

The versatility of machine learning engines combined with the amount of data available can make it difficult for digital content producers to select types of data, sources of data, or training parameters that effectively predict user actions and characteristics.

BRIEF DESCRIPTION OF THE DRAWINGS

The techniques introduced here may be better understood by referring to the following Detailed Description in conjunction with the accompanying drawings, in which like reference numerals indicate identical or functionally similar elements.

DETAILED DESCRIPTION

Figure 1:
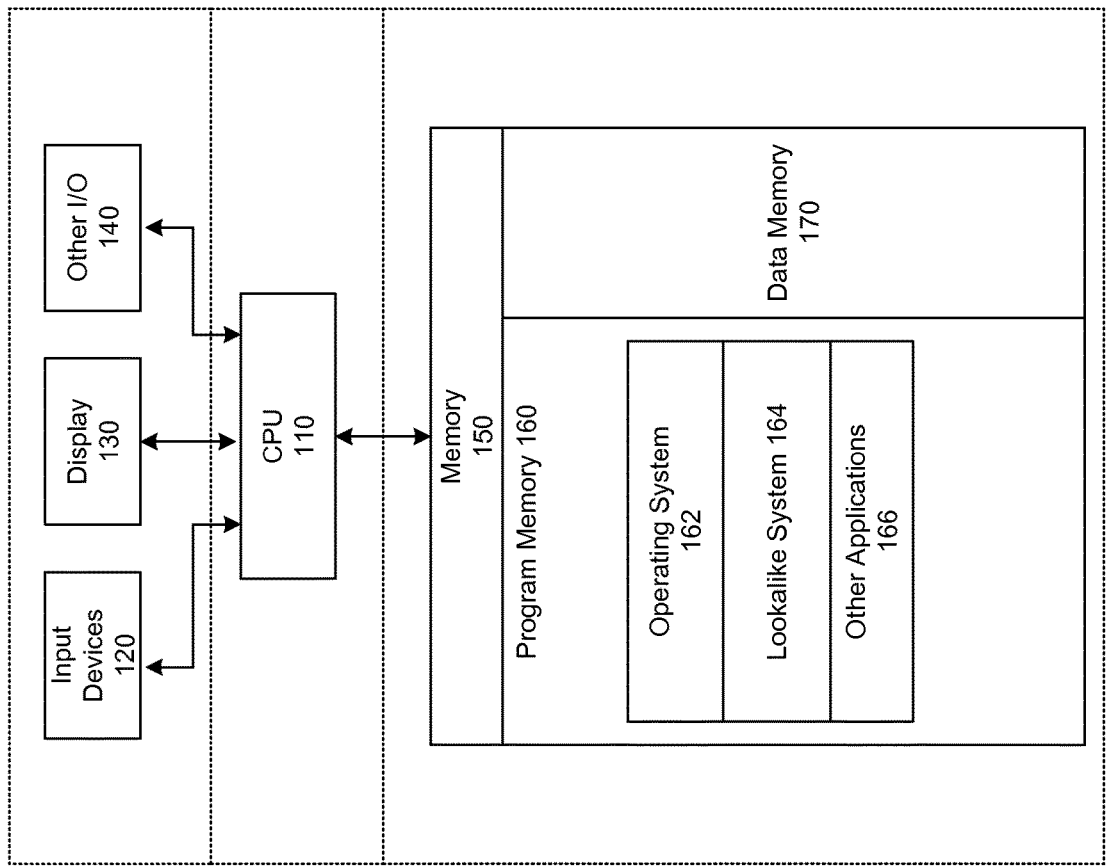
FIG. 1 is a block diagram illustrating an overview of devices on which some implementations can operate.

Embodiments are described for generating lookalike models which can select users similar to a given set of users. An aspect of providing digital content to users can be predicting characteristics of those users or predicting how those users will react to receiving the digital content. A lookalike system can accomplish these predictions by selecting users based on comparisons to "seed" users who have been identified as performing particular actions or having particular characteristics. Seed users are further explained below. A "lookalike audience," as used herein, is a set of users expected to share characteristics or actions with the defined set of seed users. In some implementations, a lookalike system can be based in part on exclusions, meaning users are more likely to be selected for the lookalike audience if they do not share a threshold amount of features with seed users. For example, users can be selected who have never purchased a product from a particular manufacturer.

A "seed" or "seed user," as used herein, is a user who is identified as having a particular characteristic or performing a particular action. A lookalike system can select members in a lookalike audience based on selected "features" of seed users, such as age, gender, location, education, income, profession, interests, identified actions, or other characteristics. The lookalike system can then find a lookalike audience comprising users who share some or all of the selected features.

A "seed group," as used herein, can be a group of seed users identified from a specified seed source. A "seed source," as used herein, can define one or more parameters used by a lookalike system to select seeds. For example, a seed source can be factors that can differentiate users such as: being on a preferred customer list, having interacted with a particular piece of content, having installed or interacted with a particular application, having provided a particular type of feedback, having visited a particular webpage, having purchased or shown interest in a particular product or product category, having redeemed a specified coupon, etc. Such parameters defining a characteristic or action that a seed user has are referred to herein as "positive" seed parameters. Seed parameters can also be "negative," indicating characteristics or actions seed users do not have or have not performed. Examples of negative seed parameters include: users who are not in a particular age group, users who have not clicked on a specified ad, users who have not purchased a particular product, or users who have not used a specified coupon.

One way a lookalike system can select users for a lookalike audience is by training a machine learning engine using a seed group as training data. A machine learning engine trained to identify a lookalike audience is referred to herein as a "lookalike model."

Training lookalike models can be computationally expensive, particularly in systems such as social medial websites that have data on millions of user interactions occurring each day. The lookalike system can be improved to train lookalike models using less time and processing power while maintaining an acceptable level of performance. The lookalike system can accomplish this by narrowing down either or both of the sources for seeds that will be used to train a lookalike model and/or the size of a set of features that is used to filter the seed sources. Additionally, lookalike model performance can be improved by determining values for training parameters that provide optimized lookalike models.

In some implementations, the lookalike system can obtain seed group training data using one or more preferred seed sources. The lookalike system can identify preferred seed sources by first obtaining seed groups from multiple seed sources. These seed sources can have different ratios of positive:negative seed parameters. The lookalike system can next select subsets of the seed groups as training seed groups, such as by filtering the seed groups with a feature list. The lookalike system can apply a universal holdout to the training seed sets to obtain unions that have common evaluation data. The lookalike system can apply a universal holdout by: merging the training seed sets; sorting the merged training seed sets on evaluation data types, which can include one or more of a cluster ID, user ID, etc.; and selecting, based on the sorting, evaluation data that is common across the training seed sets.

The lookalike system can limit the amount of resources required to create lookalike models by reducing the size of the unions. The lookalike system can accomplish this by sampling each union until it selects a number of seeds that include a threshold number of features. The lookalike system can use each of the reduced size unions to train a lookalike model. Finally, the lookalike system can compare performances of the trained lookalike models to select seed sources that resulted in lookalike models with performances above a threshold level. Additional details regarding identifying preferred seed sources are provided below in relation to FIG. 5.

In some implementations, the lookalike system can filter seed group training data that is used for creating lookalike models using preferred seed features. The lookalike system can identify preferred seed features by first obtaining a seed group from a seed source. The lookalike system can then identify possible preferred features by creating multiple test feature groups where each test feature group excludes one or more possible preferred features. For example, the lookalike system can have a list of features including: content_item_like, advertisement_clicked, age_range, and app_used. In this example, the lookalike system can test the advertisement_clicked feature as a possible preferred feature by excluding the advertisement_clicked feature from a test feature group.

The lookalike system can then create multiple subsets of the seed group by applying each test feature group to a copy of the seed group. The lookalike system can apply a test feature group by removing seeds from the seed group that do not have a seed parameter that matches at least one feature in that test feature group.

The lookalike system can, in some implementations, reduce the resource requirements for generating a lookalike model by creating training seed groups sampled from the subsets. The sampling can continue for each subset until seeds with a threshold number of features are selected in a training seed group. The lookalike system can then use the training seed groups to create corresponding lookalike models.

The lookalike system can then score the one or more possible preferred features that were excluded from selected test feature groups by comparing the performance of the lookalike model that was created with a feature group that excludes that possible preferred feature. Based on the score comparisons, the lookalike system can identify preferred seed features, e.g., the seed features that, when excluded from creation of one or more lookalike models, did not degrade performance of those lookalike models above a threshold amount. Continuing the above example, the lookalike system can determine that a lookalike model created without the use of the advertisement_clicked feature is 97% as effective as a lookalike model crated using all the features. If a threshold level is 99%, the advertisement_clicked feature can be included in the preferred feature list. Additional details regarding identifying preferred seed features are provided below in relation to FIG. 6.

In some implementations, a lookalike system can train a lookalike model using preferred training parameters. The lookalike system can identify preferred training parameters by first obtaining a seed group from a seed source. The lookalike system can then create a subset of the seed group by filtering the seed group with a group of features. The lookalike system can filter the group of features by removing seeds from the seed group that do not have a seed parameter that matches at least one feature in the group of features. The lookalike system can reduce the resource requirements for generating a lookalike model by creating a training seed group sampled from the subset. The sampling can continue until seeds that together include a threshold number of features are selected in the training seed group.

The lookalike system can then create multiple lookalike models using the training seed group where each of the multiple lookalike models is created with at least one training parameter different from training parameters used to create others of the multiple lookalike models. The lookalike system can score the training parameters used in the creation of each lookalike model based on a comparison of performances of the trained lookalike models. Finally, the lookalike system can identify preferred training parameters based on these scores. For example, training parameters used to create lookalike models that have a performance above a threshold level can be identified as preferred training parameters. Additional details regarding identifying preferred model training parameters are provided below in relation to FIG. 7.

Several implementations are discussed below in more detail in reference to the figures. FIG. 1 is a block diagram illustrating an overview of devices on which some implementations can operate. The devices can comprise hardware components of a device 100 that can build and use lookalike models or identify lookalike model creation aspects. Device 100 can include one or more input devices 120 that provide input to the CPU (processor) 110, notifying it of actions. The actions are typically mediated by a hardware controller that interprets the signals received from the input device and communicates the information to the CPU 110 using a communication protocol. Input devices 120 include, for example, a mouse, a keyboard, a touchscreen, an infrared sensor, a touchpad, a wearable input device, a camera- or image-based input device, a microphone, or other user input devices.

CPU 110 can be a single processing unit or multiple processing units in a device or distributed across multiple devices. CPU 110 can be coupled to other hardware devices, for example, with the use of a bus, such as a PCI bus or SCSI bus. The CPU 110 can communicate with a hardware controller for devices, such as for a display 130. Display 130 can be used to display text and graphics. In some examples, display 130 provides graphical and textual visual feedback to a user. In some implementations, display 130 includes the input device as part of the display, such as when the input device is a touchscreen or is equipped with an eye direction monitoring system. In some implementations, the display is separate from the input device. Examples of display devices are: an LCD display screen, an LED display screen, a projected, holographic, or augmented reality display (such as a heads-up display device or a head-mounted device), and so on. Other I/O devices 140 can also be coupled to the processor, such as a network card, video card, audio card, USB, firewire or other external device, camera, printer, speakers, CD-ROM drive, DVD drive, disk drive, or Blu-Ray device.

In some implementations, the device 100 also includes a communication device capable of communicating wirelessly or wire-based with a network node. The communication device can communicate with another device or a server through a network using, for example, TCP/IP protocols. Device 100 can utilize the communication device to distribute operations across multiple network devices.

The CPU 110 can have access to a memory 150. A memory includes one or more of various hardware devices for volatile and non-volatile storage, and can include both read-only and writable memory. For example, a memory can comprise random access memory (RAM), CPU registers, read-only memory (ROM), and writable non-volatile memory, such as flash memory, hard drives, floppy disks, CDs, DVDs, magnetic storage devices, tape drives, device buffers, and so forth. A memory is not a propagating signal divorced from underlying hardware; a memory is thus non-transitory. Memory 150 can include program memory 160 that stores programs and software, such as an operating system 162, lookalike system 164, and other application programs 166. Memory 150 can also include data memory 170 that can include, for example, seeds, feature sets, lookalike models, scoring thresholds, identified preferred features, identified preferred seed sources, identify preferred training parameters, configuration data, settings, user options or preferences, etc., which can be provided to the program memory 160 or any element of the device 100.

Some implementations can be operational with numerous other general purpose or special purpose computing system environments or configurations. Examples of well-known computing systems, environments, and/or configurations that may be suitable for use with the technology include, but are not limited to, personal computers, server computers, handheld or laptop devices, cellular telephones, wearable electronics, tablet devices, multiprocessor systems, microprocessor-based systems, set-top boxes, programmable consumer electronics, network PCs, minicomputers, mainframe computers, distributed computing environments that include any of the above systems or devices, or the like.

Figure 2:
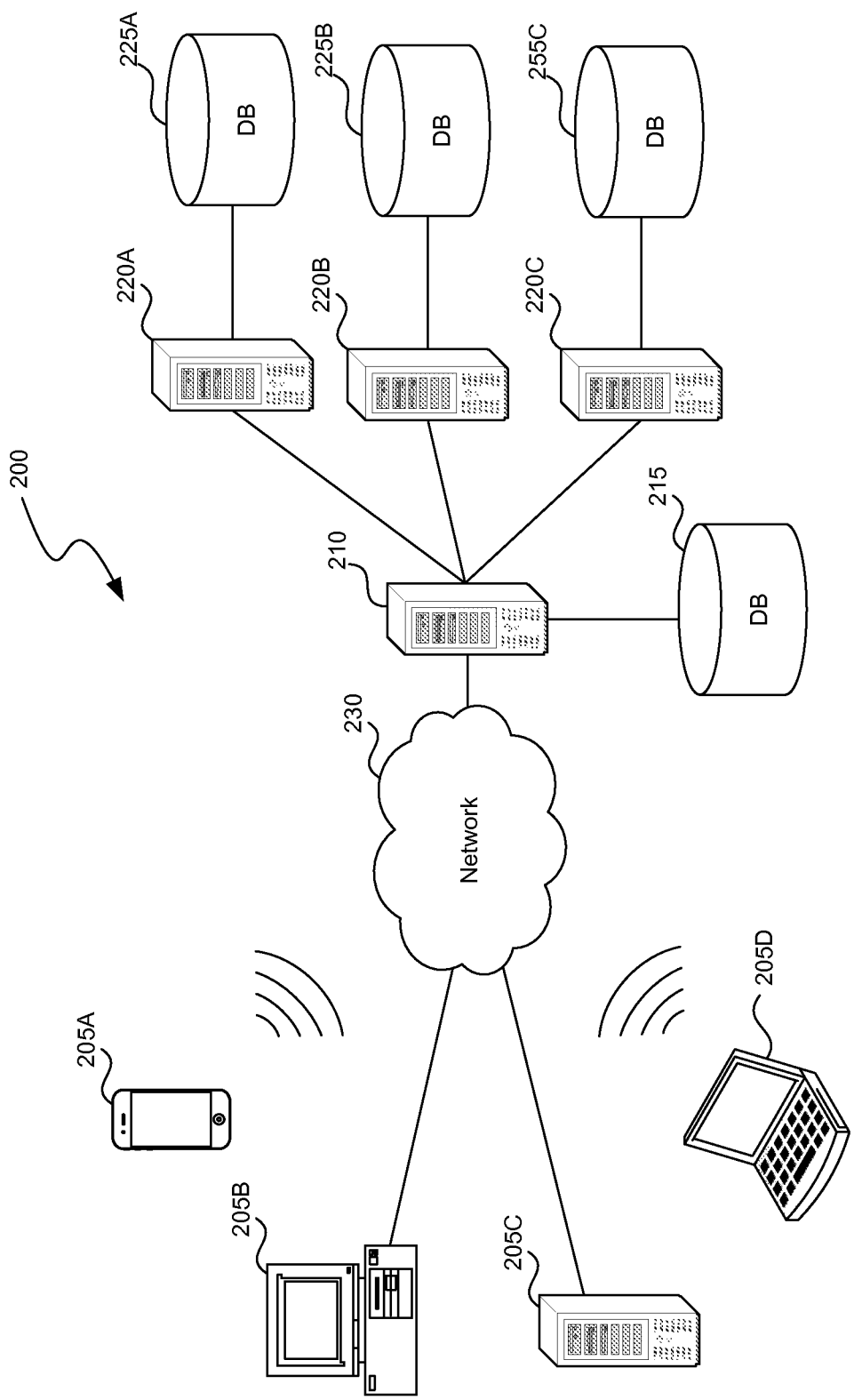
FIG. 2 is a block diagram illustrating an overview of an environment in which some implementations can operate.

FIG. 2 is a block diagram illustrating an overview of an environment 200 in which some implementations can operate. Environment 200 can include one or more client computing devices 205A-D, examples of which can include device 100. Client computing devices 205 can operate in a networked environment using logical connections 210 through network 230 to one or more remote computers, such as a server computing device.

In some implementations, server 210 can be an edge server which receives client requests and coordinates fulfillment of those requests through other servers, such as servers 220A-C. Server computing devices 210 and 220 can comprise computing systems, such as device 100. Though each server computing device 210 and 220 is displayed logically as a single server, server computing devices can each be a distributed computing environment encompassing multiple computing devices located at the same or at geographically disparate physical locations. In some implementations, each server 220 corresponds to a group of servers.

Client computing devices 205 and server computing devices 210 and 220 can each act as a server or client to other server/client devices. Server 210 can connect to a database 215. Servers 220A-C can each connect to a corresponding database 225A-C. As discussed above, each server 220 can correspond to a group of servers, and each of these servers can share a database or can have their own database. Though databases 215 and 225 are displayed logically as single units, databases 215 and 225 can each be a distributed computing environment encompassing multiple computing devices, can be located within their corresponding server, or can be located at the same or at geographically disparate physical locations.

Network 230 can be a local area network (LAN) or a wide area network (WAN), but can also be other wired or wireless networks. Network 230 may be the Internet or some other public or private network. Client computing devices 205 can be connected to network 230 through a network interface, such as by wired or wireless communication. While the connections between server 210 and servers 220 are shown as separate connections, these connections can be any kind of local, wide area, wired, or wireless network, including network 230 or a separate public or private network.

Figure 3:
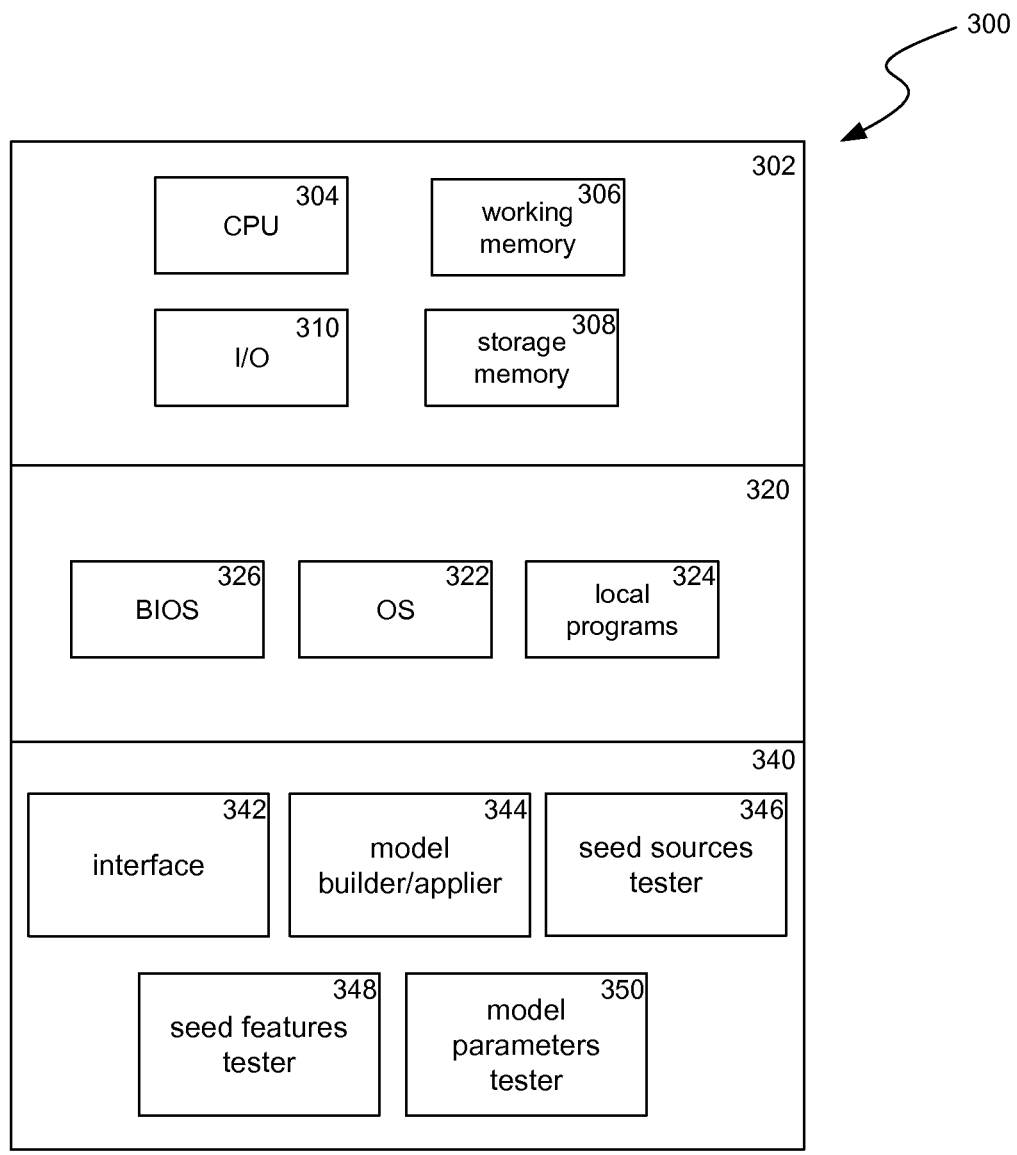
FIG. 3 is a block diagram illustrating components which, in some implementations, can be used in a system employing the disclosed technology.

FIG. 3 is a block diagram illustrating components 300 which, in some implementations, can be used in a system employing the disclosed technology. The components 300 include hardware 302, general software 320, and specialized components 340. As discussed above, a system implementing the disclosed technology can use various hardware including central processing units 304, working memory 306, storage memory 308, and input and output devices 310. Components 300 can be implemented in a client computing device such as client computing devices 205 or on a server computing device, such as server computing device 210 or 220.

General software 320 can include various applications including an operating system 322, local programs 324, and a basic input output system (BIOS) 326. Specialized components 340 can be subcomponents of a general software application 320, such as local programs 324. Specialized components 340 can include model builder/applier 344, seed sources tester 346, seed features tester 348, model parameters tester 350, and components which can be used for transferring data and controlling the specialized components, such as interface 342. In some implementations, components 300 can be in a computing system that is distributed across multiple computing devices or can include an interface to a server-based application.

Model builder/applier 344 can be configured to use a seed group to train a lookalike model. The seed group can be obtained from a preferred seed source identified by seed sources tester 346. The seed group can be obtained, for example, using interface 342. In some implementations, seed sources can include a list of users provided by a merchant, such as the merchant's best customers, the merchant's new customers, users the merchant has sent advertising materials to, etc. In some implementations, seed sources can be a script, application, widget, etc. that automatically identifies users that perform certain actions or have certain characteristics. For example, a seed source can be a program that identifies users that install a particular application, are within a certain age group, are associated with particular location, click on a particular ad, like a particular piece of content, are friends with one or more of a particular group of people, have a particular income, have a particular job, have a particular education level, etc. In various implementations, the seed source can identify these actions or characteristics by monitoring user interaction such as with an advertisement or application, or by accessing information previously identified for users such as in a user profile database of a social media website.

The seed group can also be filtered such that the seed group includes seeds with parameters corresponding to a preferred set of features, such as a preferred set of features identified by seed features tester 348. Seed features can be attributes that can be associated with seed users including identified characteristics or actions. For example, features can include age, gender, location, nationality, religion, friends, education, relationship status, occupation, content interactions (likes, clicks, comments, installs, votes, etc.), messaging characteristics (frequency, recipients, length, content, etc.), social media website usage (login times, frequency of use, length of use, most frequent or most typical interactions, etc.), etc. Possible characteristics or actions that can be features can overlap with possible characteristics or actions that can define a seed source.

For example, a seed source can be a program that monitors user interaction with a particular advertisement, and selects as user seeds the users who are between the ages of 18-25 and who click on the advertisement. This seed source may return 50,000 seed users. A set of preferred features can identify that lookalike models perform better when they are created with training data that includes seed users who have an identified education level and have a specified level of use with a social media website. The 50,000 seed users returned from the seed source can be filtered to include only those for which an education level is known and which have the specified level of interaction with the social media website.

Model builder/applier 344 can use the seed group to train a lookalike model that will determine whether a particular user is similar to the users corresponding to the obtained seed group. The lookalike model can, for example, be a neural network, support vector machine, or other type of machine learning class that can be trained using a set of labeled samples. Model builder/applier 344, when training the lookalike model, can use preferred training parameters identified by model parameters tester 350. Using a set of training seeds to build a lookalike model is discussed in more detail below in relation to FIG. 4.

Seed sources tester 346 can be configured to identify preferred seed sources, e.g., seed sources that, when used, produce lookalike models with a performance above a threshold level. Seed source tester 346 can obtain multiple seed sources, e.g., using interface 342. Seed source tester 346 can then obtain a set of training data from each of the multiple seed sources. Obtaining a set of training data from a seed source can include one or more of: filtering the seeds from the seed source using a set of features, applying a universal holdout to each filtered set to obtain unions of seeds that have common evaluation data, or sampling each union to obtain training samples of a reasonable size. Seed sources tester 346 can then use each training sample to train a lookalike model and compare performances of the trained lookalike models. In some implementations, seed source tester 346 can compare performances by evaluating the trained lookalike models against a baseline lookalike model. For lookalike models with performances above a threshold, corresponding seed sources (i.e. the seed sources from which the seeds were obtained to create these lookalike models) can be identified as the preferred seed sources. Identifying preferred seed sources is discussed in more detail below in relation to FIG. 5.

Seed features tester 348 can be configured to identify preferred features, e.g., features that identify seed user attributes that, when seed users have a value for these attributes, produce better performing lookalike models. Seed feature tester 348 can generate multiple sets of features by identifying various overlapping subsets of possible preferred features. Each of these subsets can exclude a feature to be tested for not being a preferred feature, e.g., when a subset is used to filter seed users to create a lookalike model, if excluding the feature did not significantly degrade performance of the resulting lookalike model (i.e. below a threshold level), the excluded feature can be a less preferred feature.

Seed features tester 348 can then obtain a set of training data corresponding to each of the subsets of features. Obtaining a set of training data for a selected subset of features can include one or more of: obtaining a set of seed users, applying the selected subset of features to filter the obtained set of seeds, or sampling the filtered set of seeds to decrease the size of the training data. Seed features tester 348 can then use each training sample to train a lookalike model and compare performances of the trained lookalike models. In some implementations, seed features tester 348 can compare performances by evaluating the trained look like models against a baseline lookalike model. For lookalike models with performances below a threshold, corresponding possible preferred features (i.e. the features excluded from filtering seeds in the creation of these lookalike models) can be identified as preferred features. Identifying preferred features is discussed in more detail below in relation to FIG. 6.

Model parameters tester 350 can be configured to identify preferred model training parameters, e.g., training parameters that when applied during the training of lookalike models produce better performing lookalike models. Model training parameters can control various aspects of training a model such as global weight (regularization —controlling the sparseness of the model), a maximum number of features, a minimum feature frequency, a bagging number, etc. Model parameters tester 350 can obtain a set of training data by performing one or more of: obtaining a set of seed users, filtering the obtained seed users with a set of features, or sampling the filtered set of seeds to decrease the size of the training data. Model parameters tester 350 can then train multiple lookalike models specifying different values for one or more model training parameters when creating each lookalike model. For example, three lookalike models can be trained with corresponding global weights set to 0.5, 1, and 3. Model parameters tester 350 can then compare performances of the trained lookalike models. In some implementations, model parameter tester can compare performances by evaluating the trained lookalike models against a baseline lookalike model. For lookalike models with performances above a threshold, corresponding model parameters (i.e. the model parameters used to create these lookalike models) can be identified as the preferred model parameters. Identifying preferred model training parameters is discussed in more detail below in relation to FIG. 7.

Those skilled in the art will appreciate that the components illustrated in FIGS. 1-3 described above, and in each of the flow diagrams discussed below, may be altered in a variety of ways. For example, the order of the logic may be rearranged, substeps may be performed in parallel, illustrated logic may be omitted, other logic may be included, etc.

Figure 4:
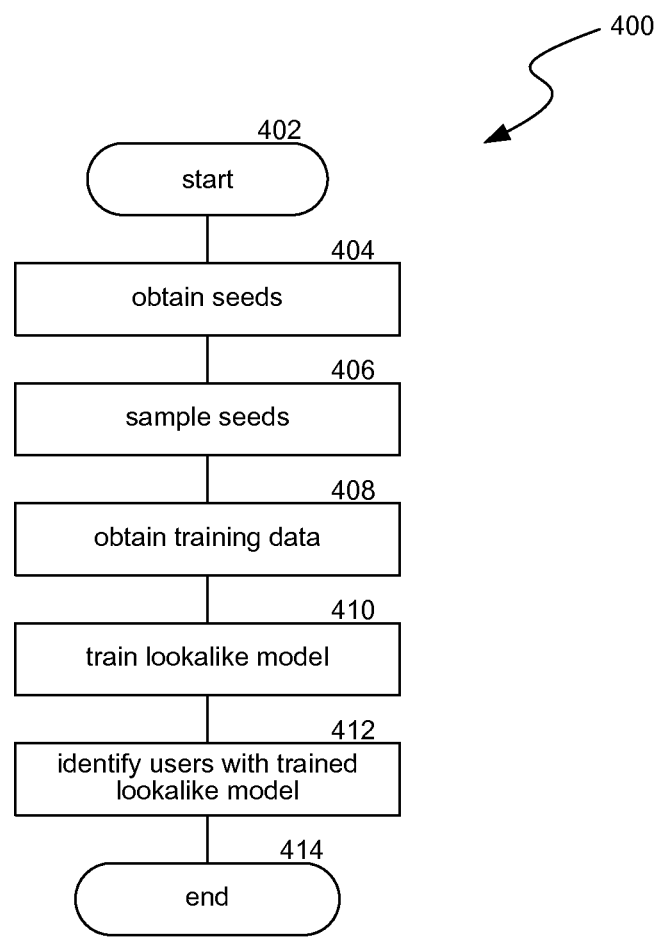
FIG. 4 is a flow diagram illustrating a process used in some implementations for identifying a lookalike audience.

FIG. 4 is a flow diagram illustrating a process 400 used in some implementations for identifying a lookalike audience. Process 400 begins at block 402 and continues to block 404. At block 404, process 400 can obtain seeds from a seed source. The seed source can be any of: a list of users, users identified as having performed one or more particular actions, users identified as having one or more particular characteristics, or any combination thereof. In some implementations, the seed source can be a seed source identified using process 500, discussed below. Process 400 can also filter the obtained seeds to select those with seed parameters that, when used to build a lookalike model, the lookalike model classifies other users as similar to the seed users with a high degree of accuracy. In some implementations, the features used to filter the seed users can be identified using process 600, discussed below.

At block 406, process 400 can select samples of the seeds obtained at block 404. In some implementations, sampling seeds can comprise selecting seeds until seeds with seed parameters corresponding to a specified number of features are selected. In some implementations, sampling seeds can comprise selecting seeds until a specified number of seeds are selected. In some implementations, sampling seeds can comprise selecting seeds until seeds with seed parameters corresponding to a specified list of features are selected. In some implementations, process 400 can use all of the seeds obtained at block 404, and thus block 406 can be skipped.

At block 408, process 400 can obtain training data for the sampled seeds. In some implementations, sampled seeds can include identifications of the seeds without all the associated information necessary to use the seeds to train a lookalike model. Obtaining training data can comprise selecting other data for the sampled seeds that will be needed to train a lookalike model. For example, seed parameters can be obtained for each of the sampled seeds.

At block 410, process 400 can use the training data to train a lookalike model. In various implementations, a lookalike model can be a trained neural network, support vector machine, a Bayesian model, decision tree, or other machine learning model. A neural network, for example, can be a series of functions where: an input layer can receive a representation of a user and user features, such as in the form of a matrix; results of all the functions at the input layer can be passed to each function at a first hidden layer, which in turn can pass results to additional hidden layers; results of all the functions at the final hidden layer can be passed to a function at an output layer; the results of which can indicate whether the input user is similar to seed users that were used to train the network. The network can be trained by applying the seeds in the training data to the network and adjusting factors of the functions, or weights applied to function results passed to a next layer, so that the result produced by the network indicates the input user is similar to the training group. In addition, these values can be adjusted such that when the users are applied to the network from outside the training group or selected as different from the training group, the result from the network indicates the users are not familiar.

Training the lookalike model can use preferred training parameters, which can be computed using process 700, discussed below. Training parameters, for example, can control the content of the training data provided to the training model, such as: a global_weight parameter that can control regularization (sparseness of the model), a max_weight parameter that can control the maximum number of features used, a minimum_frequency parameter that can control the minimum distribution of features used, etc. Training parameters, for example, can control the process of applying the training data to train the lookalike model, such as: a starting_weights parameter that can control starting weights for edges between nodes of the neural network functions, parameters to control how much weights and function parameters are adjusted for each training data sample, or parameters controlling a support vector machine such as a kernel to use kernel parameters, dimensions parameters, or soft margin parameters.

At block 412, process 400 can identify users with the trained lookalike model that are similar to the seed users. For example, if the lookalike model is a neural network, after multiple iterations of applying seed users and adjusting the function factors, the network can be applied to new users to determine if that user is similar to the seed users. Determining whether a user is similar to the seed users can be performed by comparing the output of the output function of the network to a threshold. As another example, if a support vector machine was trained as the lookalike model at block 410, the output of the support vector machine can be a binary value indicating whether the input user is similar to the training seeds, i.e. whether the support vector machine put the representation of the user on the same side of a divider as the seed users. Applying a lookalike model to users, in some implementations, can allow advertisement or other types of targeting to people who are expected to perform similar actions as the seed users when presented with the advertisement. For example, a merchant can identify their most valuable customers such as based on lifetime value, transaction value, total order size or engagement. Applying the trained lookalike model can then identify other users, or a lookalike audience that may have similar high value to the merchant.

Figure 5:
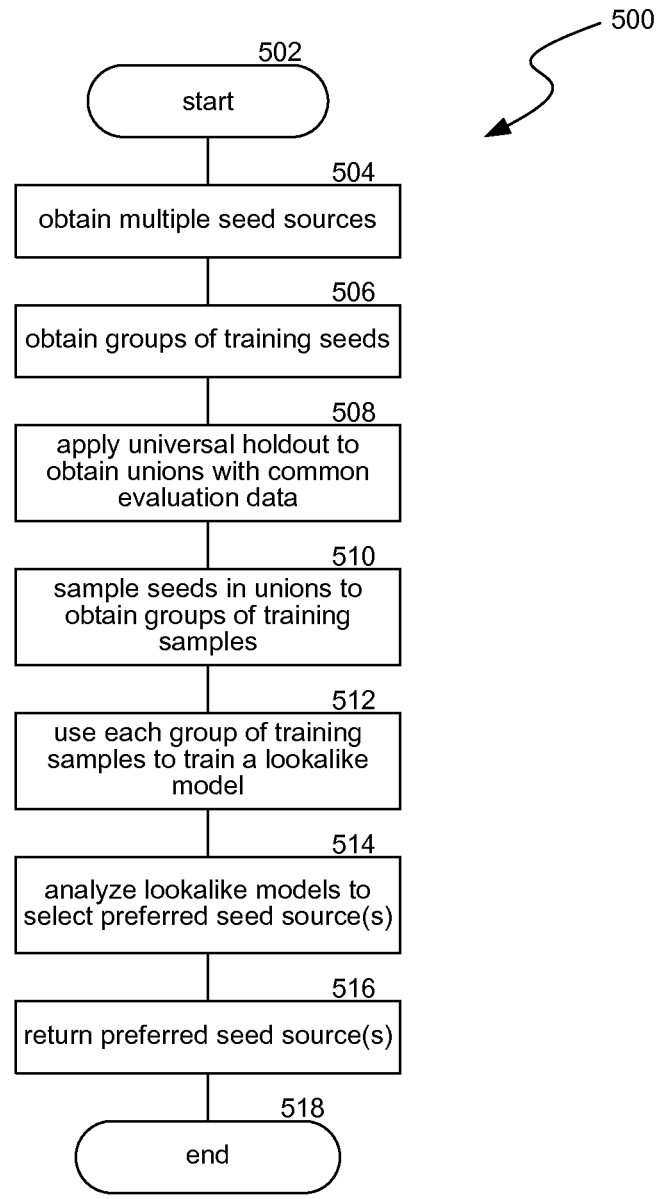
FIG. 5 is a flow diagram illustrating a process used in some implementations for identifying preferred seed sources.

FIG. 5 is a flow diagram illustrating a process 500 used in some implementations for identifying preferred seed sources. Process 500 begins at block 502 and continues to block 504. At block 504, process 500 can obtain multiple seed sources. Each seed source can be tested for being a preferred seed source by using that source to train a lookalike model and computing whether the resulting lookalike model performs well. In various implementations, seed sources can comprise a specified user list, advertisement conversions, app engagements, advertisement clicks, app votes, engagement with content within an app, content likes, types of inter-user interactions (e.g. messages, friend requests, content shares, etc.), product purchases, or combinations thereof. In some implementations, seed sources can be a combination of user actions/attributes, such as clicked an advertisement and did not make a purchase. In some implementations, seed sources can have a negative/positive ratio, where users are identified that do have the positive attributes and that do not have the negative attributes. For example, a seed source with a 2:1 positive/negative ratio can be: users that did vote on an app, did click on an advertisement within that app, did make an in-app purchase, have an income of at least $50 k, have never visited a particular merchant's webpage, and have not used a coupon for that merchant.

At block 506, process 500 can obtain groups of training seeds, one group corresponding to the actions/attributes identified by each seed source. The training seeds can be limited to seeds that match one or more features in a list of identified features, i.e. the seeds can be filtered such that only seeds with one or more seed parameters that match a filter are included in the training seeds.

At block 508, process 500 can apply a universal holdout to each of the groups of training seeds to obtain a union corresponding to each group such that each union has common evaluation data. The unions can have different positive/negative ratios. Applying a universal holdout can comprise: creating a merged group comprising the seeds from all the groups of training seeds; sorting the merged group based on evaluation data (e.g. on origination then on user identification); and selecting sets of seeds (unions) from the merged group where each union has the same evaluation data.

At block 510, process 500 can sample seeds from the unions to obtain groups of training samples. In various implementations, sampling can include selecting seeds until seeds with seed parameters corresponding to a specified number of features are selected, until seeds with seed parameters corresponding to specified features are selected, until a specified number of seeds are selected, or based on other qualifications. Sampling can be performed to reduce the processing requirements or time needed to identify preferred seed sources. In some implementations, process 500 can skip the sampling process and instead use the unions selected at block 508 as the training samples.

At block 512, process 500 can use each set of training samples generated at block 510 to train a corresponding lookalike model. As discussed above in relation to block 410, training a lookalike model can comprise training one of various types of machine learning components, such as a neural network or support vector machine.

At block 514, process 500 can analyze the lookalike models trained at block 512 and select one or more models that have performance characteristics above threshold levels. In some implementations, analyzing the lookalike models can comprise comparing the lookalike models to a baseline model and selecting one or more models that perform within a threshold accuracy of the baseline model. In some implementations, analyzing the lookalike models can comprise comparing the lookalike models to each other and selecting a top number or top percent of models. At block 516, identifications of the seed sources that process 500 used to create the lookalike models that were selected at block 514 can be returned. Process 500 then continues to block 518, where it ends.

Figure 6:
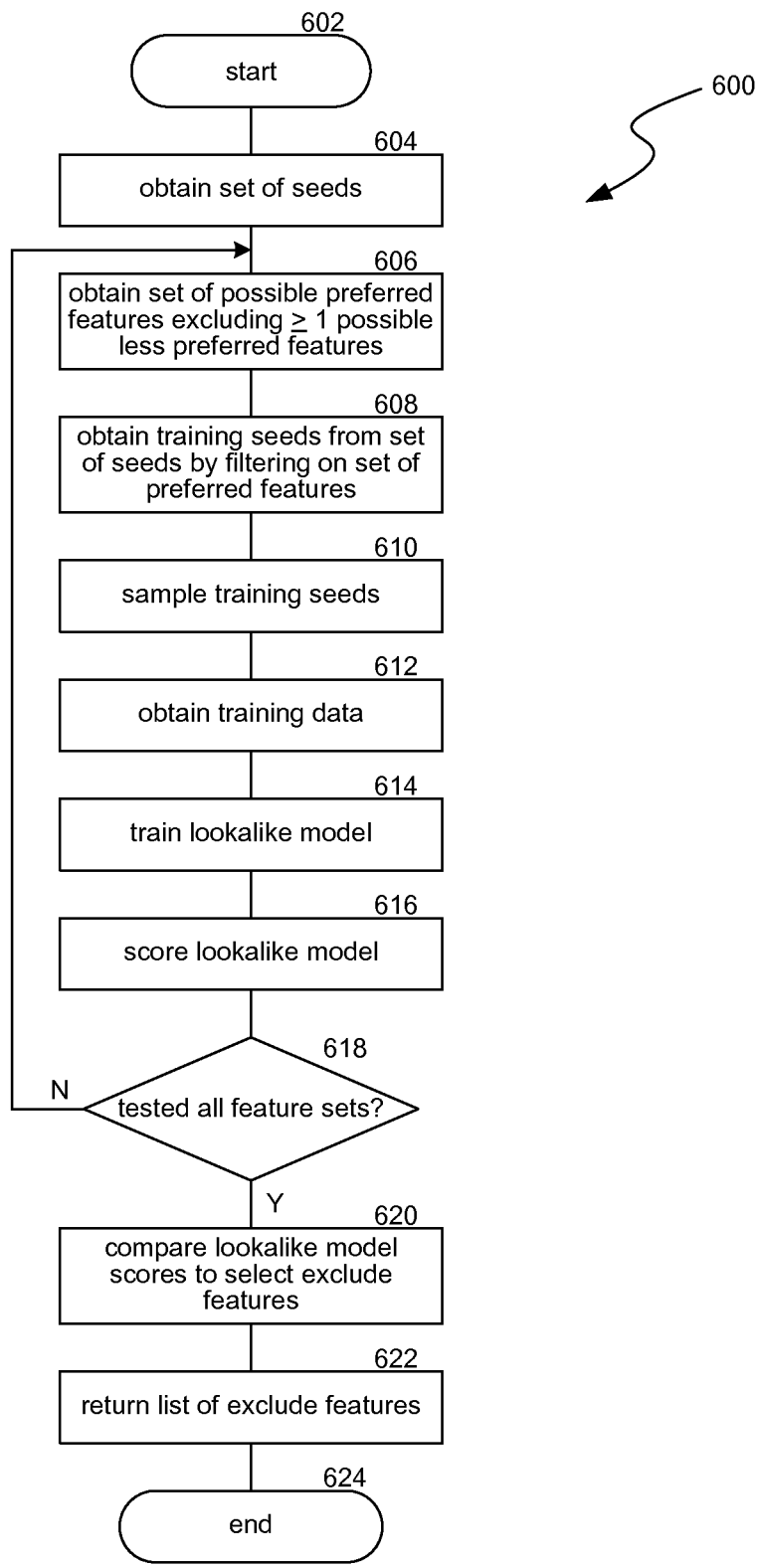
FIG. 6 is a flow diagram illustrating a process used in some implementations for identifying preferred seed features.

FIG. 6 is a flow diagram illustrating a process 600 used in some implementations for identifying preferred seed features. Process 600 begins at block 602 and continues to block 604. At block 604, process 600 can obtain a set of seeds from a seed source. As discussed above, a seed source can be one or more of: a specified list of users, a list of user characteristics, a list of user actions, or any combination thereof or negations thereof.

At block 606, process 600 can obtain a set of possible preferred features. As discussed above, a feature can be an identification of a type of user action or characteristic such as an age range, gender, application installation, product purchase, digital content interaction, friend group, etc. Process 600 can obtain this set of possible preferred features by receiving a list of features and selecting one or more of the features to be excluded from the set. Process 600 can then, at blocks 608-622, determine whether the excluded possible preferred feature is actually a preferred feature by testing whether a lookalike model created with the remaining set of possible preferred features performs below a threshold level. If performance of the resulting lookalike model was significantly hampered by not using the possible preferred feature, it is a preferred feature. The selected possible preferred features can be selected from the list of features because they are next in a sequence of features to select. For example, process 600 can select the i-th feature to test as being preferred, where i is a variable incremented in each iteration of the loop between blocks 606 and 618. Alternatively, a user can set an order of features to test in the loop as being preferred.

At block 608, process 600 can filter the seeds obtained at block 604 using the set of possible preferred features from block 606. Filtering seeds can comprise selecting seeds that have seed parameters corresponding to the possible preferred features. In some implementations, seeds can be selected that have a seed parameter value corresponding to all of the possible preferred features. In some implementations, seeds can be selected that have a seed parameter value corresponding to any of the possible preferred features.

At block 610, process 600 can sample seeds from the filtered training seeds. In various implementations, sampling can include selecting seeds until seeds with seed parameters corresponding to a specified number of features are selected, until seeds with seed parameters corresponding to specified features are selected, until a specified number of seeds are selected, or based on other qualifications. Sampling can be performed to reduce the processing requirements or time needed to identify preferred features. In some implementations, process 600 can skip the sampling process and instead use the filtered training seeds selected at block 608 as the training samples.

At block 612, process 600 can obtain training data for the seeds sampled at block 610. Obtaining training data can comprise acquiring feature specifics for the sampled seeds. For example, the operations involving seeds in blocks 604-610 can be performed with seed representations involving identifiers, e.g., user identifier, cluster identifier, etc. By reducing the amount of data corresponding to each seed in blocks 604 through 610, the memory requirements for process 600 can be reduced. At block 612 additional data for the remaining seeds, i.e., the seeds that have been sampled at block 610, can be gathered as necessary to train a lookalike model. In some implementations, additional data for the seeds can be obtained as part of originally obtaining seeds, or as part of filtering the seeds, in which case the processing for block 612 does not need to be performed.

At block 614, process 600 can use the training data obtained at block 612 to train a lookalike model. As discussed above in relation to block 410, training a lookalike model can comprise training one of various types of machine learning components, such as a neural network or support vector machine. Training a lookalike model can include the use of identified training parameters.

At block 616, process 600 can score the lookalike model trained at block 614. Scoring a lookalike model can comprise evaluating how accurate results of the lookalike model are. In various implementations, scoring a lookalike model can comprise comparing the lookalike model to a baseline model or comparing the lookalike model to other lookalike models generated by the loop between blocks 606-618. For example, the lookalike model and the baseline model can each be provided with representations of multiple users, and each user can be classified by the lookalike model and the baseline model for whether or not the user is similar to the seed users used to create the lookalike model. The score for the lookalike model can be based on how often the classification results from the lookalike model in the base model are the same. This can be computed as a percentage, e.g., the lookalike model classified the users the same way as the base model 89% of the time.

At block 618, process 600 can determine whether it has scored a lookalike model for each of the possible preferred features that is to be tested from the list of features. In various implementations, this determination can comprise identifying whether each of the features in the feature list has been excluded in the creation of a lookalike model, whether each of an identified set of features has been excluded in the creation of the lookalike model, whether the loop between blocks 606-618 has been performed a specified number of times, whether a number of scores above a threshold have been computed in iterations of the loop between blocks 606-618, whether the loop between blocks 606-618 has been performed a specified number of times, or whether a number of scores below a threshold have been computed in iterations of the loop between blocks 606-618. If process 600 has not scored a lookalike model for all of the possible preferred features that are to be tested, process 600 returns to block 606 to test the next possible preferred feature. If process 600 has scored a lookalike model for all of the possible preferred features that are to be tested, process 600 continues to block 620.

At block 620, process 600 can analyze the scores computed at block 616 to select preferred features. Selecting preferred features can occur by selecting the possible preferred features that, when excluded in the production of a lookalike model, produce a lookalike model that receives a score below a threshold. For example, features can be not identified as preferred if, when a lookalike is created without using that feature, the lookalike model identifies users the same way as a baseline model with a frequency of more than a 97% threshold, indicating that the excluded feature did not significantly impact accuracy of the lookalike model. At block 620, process 600 can, based on the scores, select preferred features to include in the preferred features list. These can be a specified number of features, a specified percentage of features from the features list, or any features corresponding to lookalike models with a score below a particular threshold. At block 622, process 600 can return identifications of the preferred features selected at block 620. Process 600 then continues to block 624 where it ends.

Figure 7:
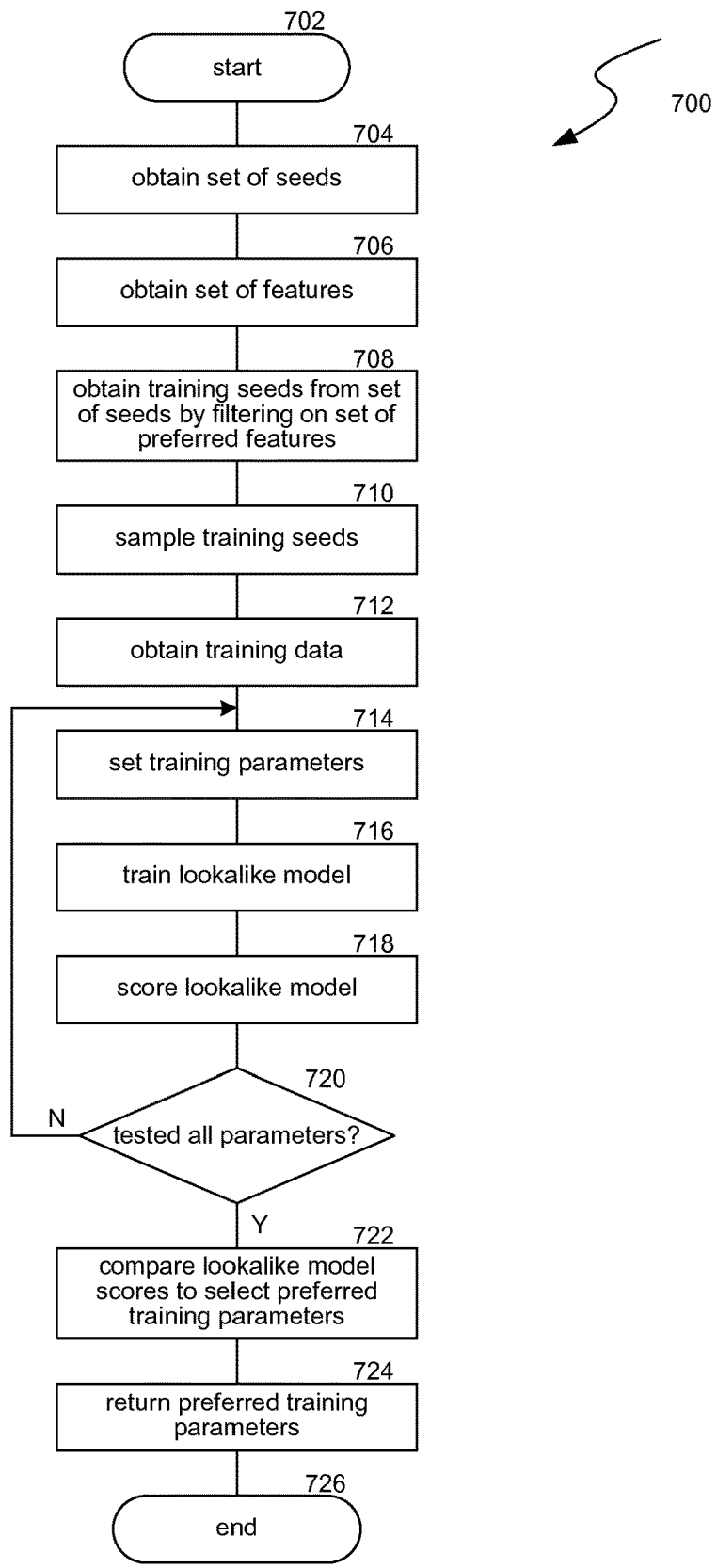
FIG. 7 is a flow diagram illustrating a process used in some implementations for identifying preferred model training parameters.

FIG. 7 is a flow diagram illustrating a process 700 used in some implementations for identifying preferred model training parameters. Process 700 begins at block 702 and continues to block 704. At block 704, process 700 can obtain a set of seeds from a seed source. As discussed above, a seed source can be one or more of: a specified list of users, a list of user characteristics, a list of user actions, or any combination thereof or negations thereof.

At block 706, process 700 can obtain a set of features. As discussed above, a feature can be an identification of a type of user action or characteristic such as an age range, gender, application installation, product purchase, digital content interaction, friend group, etc.

At block 708, process 700 can filter the seeds obtained at block 704 using the set of features from block 706. Filtering seeds can comprise selecting seeds that have seed parameters corresponding to the set of features. In some implementations, seeds can be selected that have a seed parameter value corresponding to all of the set of features. In some implementations, seeds can be selected that have a seed parameter value corresponding to any of the set of features.

At block 710, process 700 can sample seeds from the filtered training seeds. In various implementations, sampling can include selecting seeds until seeds with seed parameters corresponding to a specified number of features are selected, until seeds with seed parameters corresponding to a specified features are selected, until a specified number of seeds are selected, or based on other qualifications. Sampling can be performed to reduce the processing requirements or time needed to identify preferred features. In some implementations, process 700 can skip the sampling process and instead use the filtered training seeds selected at block 708 as the training samples.

At block 712, process 700 can obtain training data for the seeds sampled at block 710. Obtaining training data can comprise acquiring feature specifics for the sampled seeds. For example, the operations involving seeds in blocks 704-710 can be performed with seed representations involving identifiers, e.g., user identifier, cluster identifier, etc. By reducing the amount of data corresponding to each seed in blocks 704 through 710, the memory requirements for process 700 can be reduced. At block 712 additional data for the remaining seeds, i.e., the seeds that have been sampled at block 710, can be gathered as necessary to train a lookalike model. In some implementations, additional data for the seeds can be obtained as part of originally obtaining seeds, or as part of filtering the seeds, in which case the processing for block 712 does not need to be performed.

At block 714, process 700 can set parameters for training a lookalike model. In each iteration of the loop between blocks 714 and 720, process 700 can set a different value for particular training parameter or set of training parameters. These training parameters can then be used to create a lookalike model; the performance of which can be scored, as discussed below. Differences in the scores can be attributed to the differences in the values for the training parameters. In some implementations, the training parameter that process 700 sets at block 714 is a global weight parameter, which can control the sparseness of the resulting lookalike model. In some implementations, the training parameter that process 700 sets at block 714 is parameter which controls a maximum number of features used. In some implementations, the training parameter that process 700 sets at block 714 is parameter which controls a minimum frequency of feature used. Other parameters that control aspects of machine learning can also be varied by setting parameters at block 714.

At block 716, process 700 can use the training data obtained at block 712 to train a lookalike model using the training parameters set at block 714. As discussed above in relation to block 410, training a lookalike model can comprise training one of various types of machine learning components, such as a neural network or support vector machine.

At block 718, process 700 can score the lookalike model trained at block 716. Scoring a lookalike model can comprise evaluating how accurate results of the lookalike model are. In various implementations, scoring a lookalike model can comprise comparing the lookalike model to a baseline model or comparing the lookalike model to other lookalike models generated by the loop between blocks 714-720. For example, the lookalike model and the baseline model can each be provided with multiple users and each user can be classified by the lookalike model and the baseline model for whether or not the user is similar to the seed users used to create the lookalike model. The score for the lookalike model can be based on how often the classification results from the lookalike model and the base model are the same.

This can be computed as a percentage, e.g., the lookalike model classified the users the same way as the base model 98% of the time.

At block 720, process 700 can determine whether it has scored a lookalike model for each of the training parameters that are to be tested for being preferred training parameters. In various limitations, this determination can comprise determining whether a list of specified values for a particular parameter have each been used to create and score a lookalike model. For example, a global weight parameter can have an associated list with values 0.25, 0.5, 0.75, 1, 2, or 3. The loop between blocks 714 and 720 will continue until a lookalike model has been scored using each of these values for the global weight parameter. If process 700 has not scored a lookalike model for all of the training parameters that are to be tested, process 700 returns to block 714 to test the next set of training parameters. If process 700 has scored a lookalike model for all of the training parameters that are to be tested, process 700 continues to block 722.

At block 722, process 700 can analyze the scores computed at block 718 to select preferred training parameters. Selecting preferred training parameters can occur by selecting training parameters that produced lookalike models that received scores above a threshold. For example, training parameters can be identified as preferred if, when a lookalike model is created using these training parameters, the lookalike model identifies users the same way as a baseline model at least 99% of the time, indicating that the training parameters used produced a relatively accurate lookalike model. At block 724, process 700 to return identifications of the preferred training parameters selected at block 722. Process 700 then continues to block 726, where it ends.

Several implementations of the disclosed technology are described above in reference to the figures. The computing devices on which the described technology may be implemented can include one or more central processing units, memory, input devices (e.g., keyboard and pointing devices), output devices (e.g., display devices), storage devices (e.g., disk drives), and network devices (e.g., network interfaces). The memory and storage devices are computer-readable storage media that can store instructions that implement at least portions of the described technology. In addition, the data structures and message structures can be stored or transmitted via a data transmission medium, such as a signal on a communications link. Various communications links can be used, such as the Internet, a local area network, a wide area network, or a point-to-point dial-up connection. Thus, computer-readable media can comprise computer-readable storage media (e.g., "non-transitory" media) and computer-readable transmission media.

As used herein, being above a threshold means that a value for an item under comparison is above a specified other value, that an item under comparison is among a certain specified number of items with the largest value, or that an item under comparison has a value within a specified top percentage value. As used herein, being below a threshold means that a value for an item under comparison is below a specified other value, that an item under comparison is among a certain specified number of items with the smallest value, or that an item under comparison has a value within a specified bottom percentage value. As used herein, being within a threshold means that a value for an item under comparison is between two specified other values, that an item under comparison is among a middle specified number of items, or that an item under comparison has a value within a middle specified percentage range.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

Although the subject matter has been described in language specific to structural features and/or methodological acts, it is to be understood that the subject matter defined in the appended claims is not necessarily limited to the specific features or acts described above. Specific embodiments and implementations have been described herein for purposes of illustration, but various modifications can be made without deviating from the scope of the embodiments and implementations. The specific features and acts described above are disclosed as example forms of implementing the claims that follow. Accordingly, the embodiments and implementations are not limited except as by the appended claims.

Any patents, patent applications, and other references noted above are incorporated herein by reference. Aspects can be modified, if necessary, to employ the systems, functions, and concepts of the various references described above to provide yet further implementations. If statements or subject matter in a document incorporated by reference conflicts with statements or subject matter of this application, then this application shall control.

We claim:

1. A method for selecting preferred seed sources, comprising:
    obtaining multiple seed groups, each seed group including one or more users of an online system, from multiple seed sources, each seed source including users of the online system having at least one common feature;
    selecting subsets of the seed groups as training seed groups;
    generating unions from the training seed groups by selecting training seed groups that have common evaluation data, each union including two or more training seed groups including users having at least one common feature;
    using two or more of the unions that include training seed groups having at least one different feature to train two or more corresponding lookalike models, wherein different lookalike models are trained using training seed groups having at least one different feature;
    comparing performances of two or more lookalike models each trained using different unions that each include training seed groups having at least one different feature;
    selecting, based on the comparisons, training seed groups included one or more unions corresponding to lookalike models having a performance above a threshold level as preferred seed sources; and
    training one or more additional lookalike models using the selected preferred seed sources.

2. The method of claim 1, wherein the unions are obtained by applying a universal holdout to the training seed sets to select training seeds that have common evaluation data.

3. The method of claim 2, wherein applying the universal holdout comprises:
    merging the training seed sets;
    sorting the merged training seed sets on evaluation data types comprising cluster ID and/or user ID; and
    based on the sorting, selecting evaluation data that is common across the training seed sets.

4. The method of claim 1 further comprising:
reducing the size of the unions by sampling each union until each reduced size union has seeds with a threshold number of features.

5. The method of claim 1, wherein selecting subsets of the seed groups is performed by filtering the seed groups with a feature list.

6. The method of claim 5, wherein filtering the seed groups with the feature list comprises removing seeds from the seed groups that do not have a seed parameter that matches at least one feature on the feature list.

7. The method of claim 1,
wherein at least a first of the multiple seed sources is associated with a first ratio of positive:negative seed parameters; and
wherein at least a second of the multiple seed sources different from the first of the multiple seed sources is associated with a second ratio of positive:negative seed parameters different from the first ratio of positive:negative seed parameters.

8. A system for selecting preferred training parameters, comprising:
one or more processors;
a memory;
a model parameter tester, executed by the one or more processors, that performs operations comprising:
obtaining multiple seed groups from multiple seed sources, each seed group including one or more users of an online system and each seed source including users of the online system having at least one common feature;
creating subsets of the seed groups as training seed groups;
training multiple lookalike models using different training seed groups each of the multiple lookalike models is trained with a training seed group having at least one different feature from training seed groups used to train other lookalike models of the multiple lookalike models;
comparing performances of each of the lookalike models trained using training seed groups having at least one different feature from other training seed groups;
selecting one or more lookalike models having a performance above a threshold level;
for each selected lookalike model of one or more of the multiple trained lookalike models:
scoring the at least one feature of the training seed group used to train the selected lookalike model that is different from features of training seed groups used to train the other lookalike models of the multiple lookalike models;
identifying the preferred training parameters based on a comparison of results of the scoring; and
a model builder that builds one or more additional lookalike models using the preferred training parameters.

9. The system of claim 8, wherein creating the subset of the seed group is performed by filtering the seed group with a group of features.

10. The system of claim 8, wherein creating the training seed group from the subset is performed by sampling the subset until seeds with a threshold number of features are selected.

11. The system of claim 8, wherein the training parameter for the selected lookalike model controls sparseness of the selected lookalike model.

12. The system of claim 8, wherein the scoring is based on a comparison of a measured performance of the selected lookalike model to the measured performance of a baseline trained lookalike model.

13. The system of claim 8, wherein the scoring is based on a comparison of performances of the multiple trained lookalike models.

14. The system of claim 8, wherein scoring the at least one value for the training parameter that was used to train the selected lookalike model is performed by:
obtaining first results from the selected lookalike model by providing representations of multiple users to the selected lookalike model, wherein the first results indicate an expected similarity, from the selected lookalike model, between the seed group and the multiple users;
obtaining second results from a baseline lookalike model that was created with a different value for the training parameter, wherein the second results are obtained by providing representations of the multiple users to the baseline lookalike model, and wherein the second results indicate an expected similarity, from the baseline lookalike model, between the seed group and the multiple users; and
computing the results of the scoring for the selected lookalike model based on how often the first results are within a threshold similarity of the second results.

15. A computer-readable storage medium storing instructions that, when executed by a computing system, cause the computing system to perform operations for selecting preferred seed features, the operations comprising:
obtaining multiple seed groups from multiple seed sources, each seed group including one or more users of an online system and each seed source including users of the online system having at least one common feature;
creating subsets of the seed groups as training seed groups;
training a plurality of lookalike models using different training seed groups, each of the plurality of lookalike models trained with
a training seed group having at least one different feature from training seed groups used to train other lookalike models;
comparing performances of each of the lookalike models trained using training seed groups having at least one different feature from other training seed groups;
selecting one or more lookalike models having a performance above a threshold level;
for each selected lookalike model of the plurality of lookalike models:
scoring the at least one feature of the training seed group used to train the selected lookalike model that is different from features of training seed groups used to train other lookalike models of the plurality of lookalike models;
identifying the preferred seed features based on a comparison of scores for features of different training seed groups used to train at least one selected lookalike model; and
training one or more additional lookalike models using the identified preferred seed features.

16. The computer-readable storage medium of claim 15, wherein choosing the training seed groups from a selected subset is performed by sampling the selected subset until seeds with a threshold number of features are selected from that selected subset.

17. The computer-readable storage medium of claim 15, wherein choosing the training seed groups from a selected subset is performed by selecting all of the seeds in the selected subset.

18. The computer-readable storage medium of claim 15, wherein identifying the preferred seed features comprises selecting the possible preferred feature that were excluded from the creation of lookalike models that have performances below a threshold.

19. The computer-readable storage medium of claim 15, wherein the scoring is based on a comparison of a performance of the particular lookalike model with a baseline lookalike model that was trained using all of the multiple possible preferred features.

20. The computer-readable storage medium of claim 15, wherein filtering the seed group with the selected test feature group comprises removing seeds from the seed group that do not have a seed parameter that matches at least one feature in the selected test feature group.

\* \* \* \* \*

UNITED STATES PATENT AND TRADEMARK OFFICE
CERTIFICATE OF CORRECTION

PATENT NO.       : 10,380,501 B2
APPLICATION NO.  : 14/941495
DATED            : August 13, 2019
INVENTOR(S)      : Haibin Cheng et al.

It is certified that error appears in the above-identified patent and that said Letters Patent is hereby corrected as shown below:

In the Claims

Column 16, Line 53, Claim 1, delete "selecting, based on the comparisons, training seed groups included one or more" and insert -- selecting, based on the comparisons, training seed groups including one or more --.

Signed and Sealed this
Twenty-first Day of January, 2020

Andrei Iancu
*Director of the United States Patent and Trademark Office*